United States Patent
Tanji et al.

(10) Patent No.: US 8,686,074 B2
(45) Date of Patent: Apr. 1, 2014

(54) NUCLEATING AGENT MASTERBATCH FOR POLYOLEFIN RESIN

(75) Inventors: Naoko Tanji, Saitama (JP); Tomonori Shimizu, Saitama (JP); Mitsuru Fukushima, Saitama (JP)

(73) Assignee: Adeka Corporation, Tokyo (JP)

( * ) Notice: Subject to any disclaimer, the term of this patent is extended or adjusted under 35 U.S.C. 154(b) by 308 days.

(21) Appl. No.: 12/676,343

(22) PCT Filed: Aug. 20, 2008

(86) PCT No.: PCT/JP2008/064818
§ 371 (c)(1),
(2), (4) Date: Mar. 3, 2010

(87) PCT Pub. No.: WO2009/031407
PCT Pub. Date: Mar. 12, 2009

(65) Prior Publication Data
US 2010/0204374 A1 Aug. 12, 2010

(30) Foreign Application Priority Data
Sep. 4, 2007 (JP) ................... 2007-229314

(51) Int. Cl.
C08K 5/521 (2006.01)

(52) U.S. Cl.
USPC ........................................... 524/117

(58) Field of Classification Search
USPC ........................................... 524/117
See application file for complete search history.

(56) References Cited

U.S. PATENT DOCUMENTS

| 5,856,386 A * | 1/1999 | Sakai et al. ............... 524/271 |
| 2003/0125432 A1 | 7/2003 | Yukino et al. |
| 2003/0236329 A1 | 12/2003 | Kawamoto et al. |

FOREIGN PATENT DOCUMENTS

| CN | 1521203 A | 8/2004 |
| JP | 58-1736 A | 1/1983 |
| JP | 58-25341 A | 2/1983 |
| JP | 58-25431 U | 2/1983 |
| JP | 59-184252 A | 10/1984 |
| JP | 1-171834 A | 7/1989 |
| JP | 2-111515 A | 4/1990 |
| JP | 5-43746 A | 2/1993 |
| JP | 6-322195 A | 11/1994 |
| JP | 6-340786 A | 12/1994 |
| JP | 7-11075 A | 1/1995 |
| JP | 7-48473 A | 2/1995 |
| JP | 8-3364 A | 1/1996 |
| JP | 8-120116 A | 5/1996 |
| JP | 8-134260 A | 5/1996 |
| JP | 9-118776 A | 5/1997 |
| JP | 9-157437 A | 6/1997 |
| JP | 2641180 B2 | 8/1997 |
| JP | 10-25295 A | 1/1998 |
| JP | 2000-3658 A | 1/2000 |
| JP | 3046428 B2 | 5/2000 |
| JP | 3058487 B2 | 7/2000 |
| JP | 2001-59040 A | 3/2001 |
| JP | 2001-81236 A | 3/2001 |
| JP | 2001-123021 A | 5/2001 |
| JP | 2002-3658 A | 1/2002 |
| JP | 3337261 B2 | 10/2002 |
| JP | 2004-292710 A | 10/2004 |
| WO | WO-99/18108 A1 | 4/1999 |
| WO | WO-02/36677 A1 | 5/2002 |

OTHER PUBLICATIONS

Chinese Office Action issued in Chinese patent application No. 200880105367.2 on Nov. 10, 2011.

* cited by examiner

Primary Examiner — Doris Lee
(74) Attorney, Agent, or Firm — Birch, Stewart, Kolasch & Birch, LLP

(57) ABSTRACT

Provided is a nucleating agent masterbatch for polyolefin resin excellent in dispersibility into a polyolefin resin, which nucleating agent masterbatch is capable of improving transparency and mechanical strength of the polyolefin resin, which is a crystalline polymer, which nucleating agent masterbatch is further excellent in resistance to heat coloring; and a polyolefin resin composition using the masterbatch. Specifically, provided is a nucleating agent masterbatch for polyolefin resin, wherein, based on 100 parts by mass of a fully hydrogenated petroleum resin (A) having a softening point of not lower than 100° C., 3 to 150 parts by mass of an aromatic phosphate metal salt (B) represented by the following general formula (1):

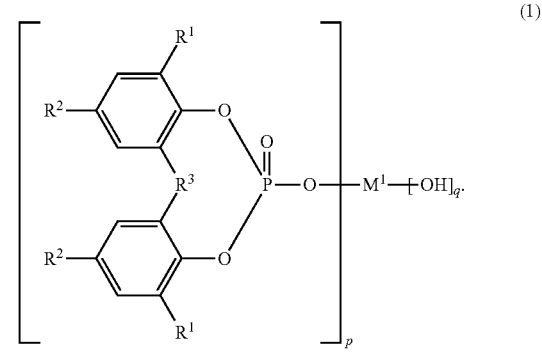

(1)

12 Claims, No Drawings

NUCLEATING AGENT MASTERBATCH FOR POLYOLEFIN RESIN

TECHNICAL FIELD

The present invention relates to a nucleating agent masterbatch for polyolefin resin and a polyolefin resin composition using the masterbatch (hereinafter also referred to as simply "masterbatch" and "resin composition"). More particularly, the present invention relates to a nucleating agent masterbatch for polyolefin resin which is excellent in dispersibility into a polyolefin resin and excellent in improving effects of transparency and mechanical strength of the polyolefin resin and a polyolefin resin composition using the masterbatch.

BACKGROUND ART

In a crystalline polymer of the polyolefin resin such as polyethylene, polypropylene or polybutene-1, there were problems such as its long molding cycle due to its slow crystallization rate after heat molding. In addition, there were some cases where molded articles altered their shape because crystallization proceeded even after the molding. Also, since these crystalline polymers generate large crystals when subjected to the heat molding, there were drawbacks in that the strength of the molded article are not sufficient and its transparency are poor.

These drawbacks are originated from the crystalline ability of the crystalline polymer. It has been known that the drawbacks can be solved by rapidly generating fine crystals. Currently, in order to rapidly generate the fine crystals, a method of adding a nucleating agent, crystallization promoting agent or the like is employed, in addition to a method of rising a crystallization temperature.

Examples of the above-mentioned nucleating agent or crystallization promoting agent include carboxylic acid metal salts such as sodium benzoate, aluminum 4-tertiary butyl benzoate salts or sodium adipic acid; phosphate metal salts such as sodium bis(4-tertiary butyl phenyl)phosphate or sodium 2,2'-methylenebis (4,6-di-tertiary butyl phenyl)phosphate; and compounds such as polyalcohol derivatives (e.g. dibenzylidene sorbitol, bis(methyl benzylidene)sorbitol or bis(dimethyl benzylidene)sorbitol). These nucleating agents and crystallization promoting agents are disclosed, for example, in Patent Documents 1 to 9.

In addition, Patent Documents 10 to 14 report a combined use of a nucleating agent made of a phosphate metal salt and an aliphatic organic acid metal salt. Further, Patent Document 15 reports a nucleating agent made of a phosphate metal salt having an average diameter of the longer axis of not more than 10 μm, an average aspect ratio of not more than 10 and a bulk specific gravity of not less than 0.1. Furthermore, as means for improving the transparency of crystalline resin, a technique using a nucleating agent and petroleum resin in combination has been known, which is reported, for example, in Patent Documents 16 to 19.

Further, in a sole addition of the nucleating agent to resin, there are problems such as working environment accompanying an addition of powders; as well as a problem of handling ability such as blocking by secondary aggregation of the nucleating agent. Due to this, the nucleating agent has been made into a masterbatch and, for example, Patent Documents 20 and 21 report masterbatches for polyolefin resin.

Patent Document 1: Japanese Unexamined Patent Application Publication No. 58-1736
Patent Document 2: Japanese Unexamined Patent Application Publication No. 59-184252
Patent Document 3: Japanese Unexamined Patent Application Publication No. 6-340786
Patent Document 4: Japanese Unexamined Patent Application Publication No. 7-11075
Patent Document 5: Japanese Unexamined Patent Application Publication No. 7-48473
Patent Document 6: Japanese Unexamined Patent Application Publication No. 8-3364
Patent Document 7: Japanese Unexamined Patent Application Publication No. 9-118776
Patent Document 8: Japanese Unexamined Patent Application Publication No. 10-25295
Patent Document 9: WO 99/18108 pamphlet
Patent Document 10: Japanese Patent No. 3046428
Patent Document 11: Japanese Patent No. 3058487
Patent Document 12: Japanese Unexamined Patent Application Publication No. 5-43746
Patent Document 13: Japanese Unexamined Patent Application Publication No. 8-134260
Patent Document 14: Japanese Unexamined Patent Application Publication No. 8-120116
Patent Document 15: Japanese Unexamined Patent Application Publication No. 2001-59040
Patent Document 16: Japanese Unexamined Patent Application Publication No. 58-25431
Patent Document 17: Japanese Patent No. 2111515
Patent Document 18: Japanese Patent No. 2641180
Patent Document 19: Japanese Patent No. 3337261
Patent Document 20: Japanese Unexamined Patent Application Publication No. 9-157437
Patent Document 21: Japanese Unexamined Patent Application Publication No. 2000-003658

DISCLOSURE OF THE INVENTION

Problems to be Solved by the Invention

As described above, with regard to the nucleating agent used in the polyolefin resin, thus far a wide variety of studies have been conducted, but sufficient results have not been obtained. For example, the nucleating agents disclosed in Patent Documents 10 to 14 are not sufficient in terms of compatibility with crystalline polymers and dispersibility into the crystalline polymers and therefore desired effects of addition are not attained, which is problematic. Also, the nucleating agent disclosed in Patent Document 15 has, when added to the crystalline polymer, effects of improving transparency and mechanical strength but has not been satisfactory. Further, the petroleum resins described in Patent Documents 16 to 19 are general petroleum resins of the market and any of these were not good. Furthermore, both of the masterbatches for polyolefin resin disclosed in Patent Documents 20 and 21 have a small nucleating agent content and a little merit as a masterbatch. Also, in general, a masterbatch containing a nucleating agent at a high concentration has poor dispersibility when added to the polyolefin resin. Because of this, the agent was not satisfactory in terms of nucleating effects such as transparency and mechanical strength of the resin.

Therefore, an object of the present invention is to provide a nucleating agent masterbatch for polyolefin resin which is excellent in dispersibility into a polyolefin resin; the masterbatch being capable of improving transparency and mechanical strength of the polyolefin resin, which is a crystalline polymer; which masterbatch is further excellent in resistance to heat coloring; and a polyolefin resin composition using the masterbatch.

Means for Solving the Problems

In order to solve the above-mentioned problems, the present inventors intensively studied to discover that a masterbatch excellent in compatibility with a polyolefin resin can be obtained by blending a prescribed amount of a specific aromatic phosphate metal salt as a nucleating agent, in particular, a prescribed amount of a specific fatty acid metal salt, into a fully hydrogenated petroleum resin having a softening point of not lower than 100° C.; and, by using this, a polyolefin resin excellent in transparency, mechanical strength and resistance to heat coloring can be obtained, thereby completing the present invention.

Hence, the nucleating agent masterbatch for polyolefin resin according to the present invention comprises, based on 100 parts by mass of the fully hydrogenated petroleum resin (A) having a softening point of not lower than 100° C., 3 to 150 parts by mass of the aromatic phosphate metal salt (B) represented by the following general formula (1):

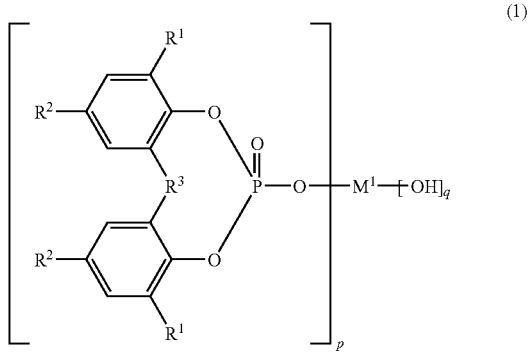

(wherein, $R^1$ represents a $C_4$-$C_8$ alkyl group; $R^2$ represents a hydrogen atom or a $C_1$-$C_8$ alkyl group; $R^3$ represents a $C_1$-$C_4$ alkylidene group; $M^1$ represents an alkaline metal atom, an alkaline earth metal atom or an aluminum atom; in cases where $M^1$ is the alkaline metal atom, p is 1 and q is 0, in cases where $M^1$ is the alkaline earth metal atom, p is 2 and q is 0, and in cases where $M^1$ is the aluminum atom, p is 1 or 2 and q equals to 3-p.)

In the masterbatch according to the present invention, it is preferred that 0.1 to 100 parts by mass of the metal salt of fatty acid or hydroxy fatty acid (C) represented by the following general formula (2) is further blended:

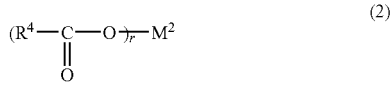

(wherein $R^4$ represents a group introduced from a $C_8$-$C_{30}$ aliphatic organic acid; $M^2$ represents an alkaline metal atom, an alkaline earth metal atom, an aluminum atom or a zinc atom; and r represents an integer of 1 to 3.)

Also, the masterbatch according to the present invention is preferably used in polypropylene or polyethylene resin as a polyolefin resin.

In addition, the polyolefin resin composition according to the present invention is added the above-mentioned nucleating agent masterbatch for polyolefin resin according to the present invention to a polyolefin resin.

Effects of the Invention

According to the present invention, by the above-mentioned structure, a nucleating agent masterbatch for polyolefin resin excellent in compatibility with a polyolefin resin, the nucleating agent masterbatch being capable of improving transparency and mechanical physical property of the polyolefin resin, which is a crystalline polymer, which nucleating agent masterbatch is excellent in resistance to heat coloring; and a polyolefin resin composition using the masterbatch can be attained.

BEST MODE FOR CARRYING OUT THE INVENTION

Preferred modes of the present invention will now be described in detail below.

The fully hydrogenated petroleum resin (A) used in the present invention having a softening point of not lower than 100° C. is a resin obtained by hydrogenating a polymer or copolymer of C5 fraction of distillate obtained by naphtha cracking, such as isoprene, cyclopentadiene or piperylene, and C9 fraction of distillate such as indene, vinyltoluene, styrene or α-methylstyrene, and the resin having a softening point (softening point measurement method: JIS K 2207 Ring and Ball method) of not lower than 100° C. Concrete examples thereof include trade name ARKON P-115 (softening point 114° C.) manufactured by Arakawa Chemical Industries, Ltd., trade name ARKON P-140 (softening point 140° C.) manufactured by Arakawa Chemical Industries, Ltd. and trade name MARUKAREZ H505 (softening point 103° C.) manufactured by Maruzen Petrochemical Co., Ltd. Aliphatic petroleum resins and partially hydrogenated petroleum resins are not preferred because of their poor resistance to heat coloring when the polyolefin resin is added. Also, ones having a softening point of less than 100° C. are not preferred because not only are transparency and mechanical physical property of the resin poor but heat discoloration of the resin and blocking of the masterbatch are likely to occur.

In the aromatic phosphate metal salt (B) represented by the above-mentioned general formula (1) used in the present invention, examples of the $C_4$-$C_8$ alkyl group represented by $R^1$ include butyl, secondary butyl, tertiary butyl, pentyl, tertiary pentyl, hexyl, cyclohexyl, heptyl, octyl, isooctyl and tertiary octyl.

Examples of the $C_1$-$C_8$ alkyl group represented by $R^2$ include methyl, ethyl, propyl, isopropyl, butyl, secondary butyl, tertiary butyl, pentyl, tertiary pentyl, hexyl, cyclohexyl, heptyl, octyl, isooctyl and tertiary octyl.

Examples of the $C_1$-$C_4$ alkylidene group represented by $R^3$ include methylene, ethylidene, propylidene and butylidene.

Examples of the metals represented by $M^1$ include alkali metals such as lithium, sodium or potassium, alkaline earth metals such as magnesium or calcium, and aluminum. Among these, the alkali metals are preferred because of their superior effects as a nucleating agent.

Examples of a method for producing the aromatic phosphate metal salt ((B) component) represented by the above-mentioned general formula (1) according to the present invention include a method in which a cyclic phosphoric acid with a corresponding structure and a metal compound such as a metal hydroxide, metal oxide, metal halide, metal sulphate, metal nitrate and metal alkoxide compound, are allowed to react using, as necessary, a reagent such as a basic compound; a method in which a alkali metal salt of a cyclic phosphate with a corresponding structure and, a metal compound such as a metal hydroxide, metal oxide, metal halide, metal sulphate, metal nitrate and metal alkoxide compound, are subjected to a salt exchange reaction using, as necessary, a reagent; and a method in which cyclic phosphorus oxychloride is used as a starting substance to generate cyclic phosphoric acid by hydrolysis and is allowed to react with a metal compound.

More specific examples of the compound represented by the above-mentioned general formula (1) include the following compounds Nos. 1 to 8. Yet, the present invention is by no means restricted by the following compounds.

Compound No. 1

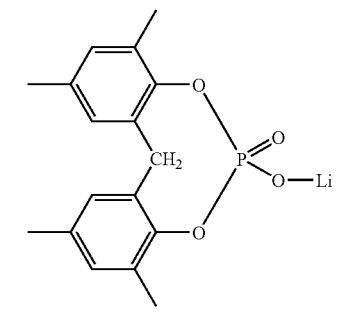

Compound No. 2

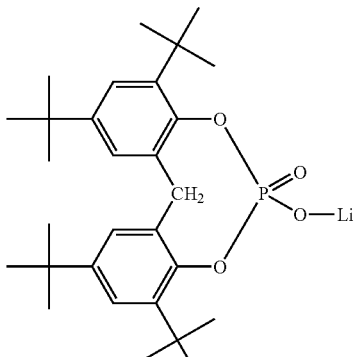

Compound No. 3

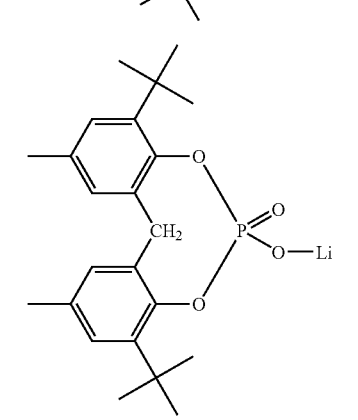

Compound No. 4

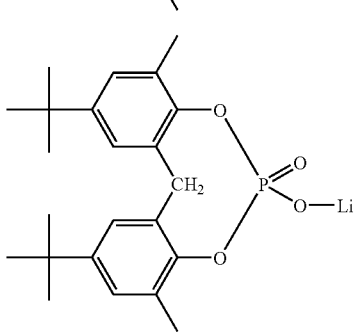

Compound No. 5

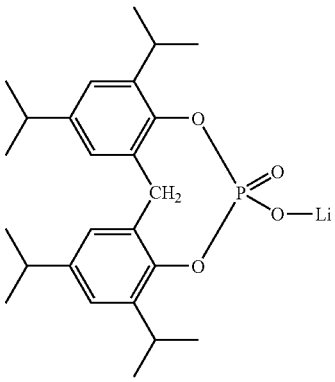

Compound No. 6

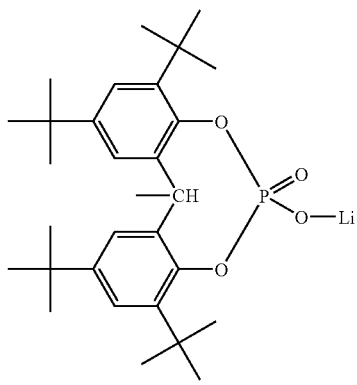

Compound No. 7

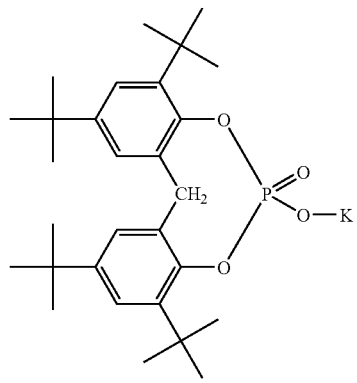

Compound No. 8

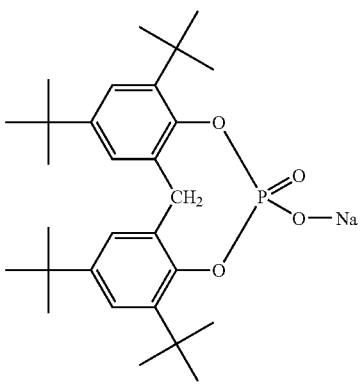

Concrete examples in cases where $M^1$ is an alkaline earth metal atom include the following compounds Nos. 9 to 12.
Compound No. 9
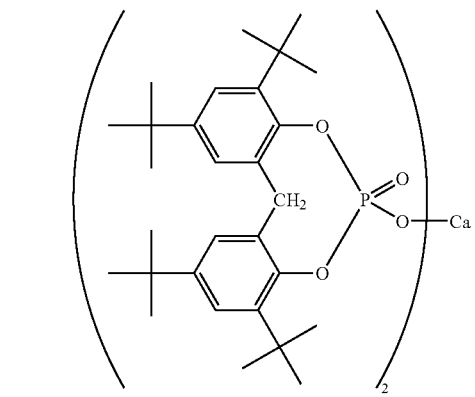
Compound No. 10
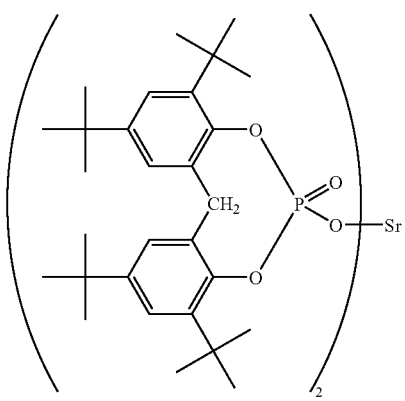
Compound No. 11
Compound No. 12
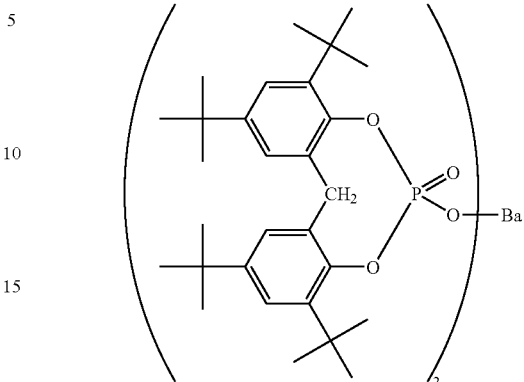
Concrete examples in cases where $M^1$ is an aluminum atom include the following compounds No. 13 to No. 16.
Compound No. 13
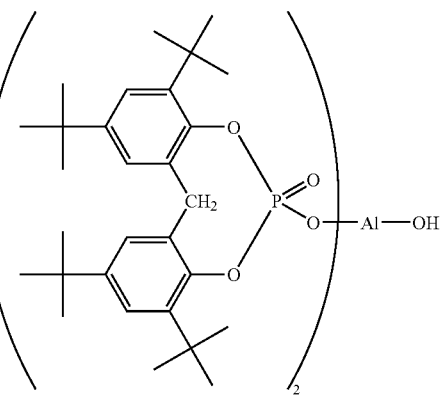
Compound No. 14
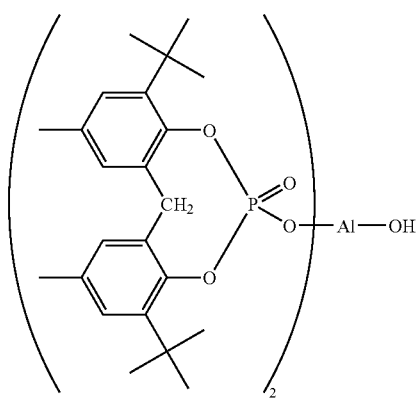

Compound No. 15

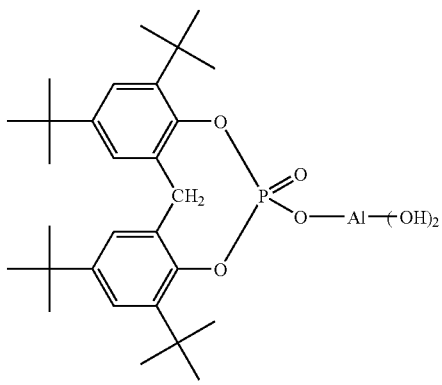

Compound No. 16

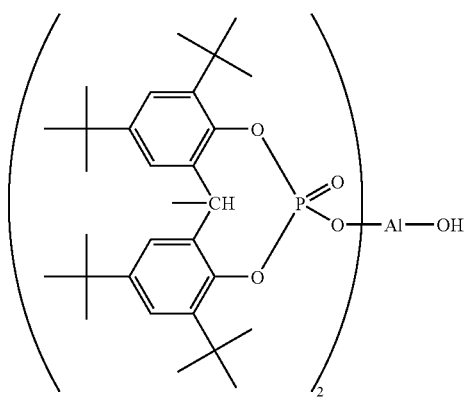

The blending ratio between the aromatic phosphate metal salt (B) represented by the above-mentioned general formula (1) according to the present invention and the fully hydrogenated petroleum resin (A) is 3 to 150 parts by mass of the (B) component based on 100 parts by mass of the (A) component. When the (B) component is less than 3 parts by mass, effects as a nucleating agent, such as transparentizing effects, decrease. Meanwhile, when the (B) component exceeds 150 parts by mass, compatibility with a polyolefin resin is impaired and properties such as transparency deteriorate.

In the metal salt of fatty acid or hydroxy fatty acid (C) represented by the above-mentioned general formula (2) according to the present invention, the $R^4$ group is a group introduced from a $C_8$-$C_{30}$ aliphatic organic acid. This aliphatic organic acid may have a hydroxyl group and may have an unsaturated bond. Concrete examples include capric acid, neodecanoic acid, undecanoic acid, lauric acid, tridecanoic acid, myristic acid, pentadecanoic acid, palmitic acid, margaric acid, stearic acid, nonadecanoic acid, arachidic acid, behenic acid, lignoceric acid, cerotic acid, montanic acid, melissic acid, obtusilic acid, linderic acid, tsuzuic acid, palmitoleic acid, petroselinic acid, oleic acid, elaidic acid, vaccenic acid, linoleic acid, linoelaidic acid, γ-linolenic acid, linolenic acid, ricinoleic acid, 12-hydroxystearic acid, naphthenic acid and abietic acid. Among these, stearic acid or 12-hydroxystearic acid is preferred because of its low cost and prominent effect of use. Also, examples of the alkaline metal atom represented by $M^2$ include lithium, sodium and potassium; and examples of the alkaline earth metal include magnesium, calcium, strontium and barium.

The added amount of the fatty acid metal salt (C) according to the present invention is, based on 100 parts by mass of fully hydrogenated petroleum resin (A), preferably 0.1 to 100 parts by mass because good effects of addition are attained, and more preferably 1 to 50 parts by mass.

A method for producing the masterbatch according to the present invention is not restricted and can be carried out by a conventional, known method. For instance, after dry blending of blend components, the resultant may be mixed using a Henschel mixer, a mill roll, a Banbury mixer, a super mixer or the like and then may be kneaded using a uniaxial extruder, a biaxial extruder or the like. This mixing and kneading is usually carried out at temperatures from not lower than a softening point temperature of a resin to approximately 300° C. From the viewpoint of resistance to heat discoloration after an addition to the polyolefin resin and performance such as transparency, it is preferred to be a low temperature range and temperatures from not lower than a softening point of the resin to 170° C. are preferred.

A polyolefin resin to which the masterbatch according to the present invention is applied is not restricted as long as it is a polyolefin resin, and any polyolefin resins can be employed. Concrete examples thereof include homopolymers or copolymers of α-olefins such as polypropylene, low density polyethylene, linear low density polyethylene, high density polyethylene, polybutene-1, poly-3-methylpentene, poly-4-methylpentene, cyclo-olefin polymer or ethylene-propylene copolymer.

A method for blending the masterbatch according to the present invention in the polyolefin resin is not restricted and a known blending technique into resin is employed. Examples thereof include a method in which the masterbatch and powders or pellets of the polyolefin resin are mixed using a Henschel mixer or the like in the same manner as the above-mentioned conditions for the production of the masterbatch, and the resultant is kneaded using an extruder or the like. The type of processing machines used, processing temperature, cooling conditions after the processing, and the like are also not restricted. It is preferred to select conditions where resin physical properties to be obtained are suitable to the intended use. This mixing and kneading is usually carried out at temperatures about 150 to 300° C.

The mass ratio when the masterbatch according to the present invention is blended in the polyolefin resin is an amount such that the (B) component in the masterbatch is 0.01 to 20 parts by mass, preferably 0.05 to 10 parts by mass, based on 100 parts by mass of the polyolefin resin.

To the masterbatch according to the present invention or polyolefin resin composition in which the masterbatch is added in the polyolefin resin, various compounding agents which are usually used for each resin can be added as necessary. To the polyolefin resin composition according to the present invention, as these compounding agents, the above-mentioned nucleating agent (B) or fatty acid metal salt (C) may further be blended. In this case, the preferred amount of each component to be added can be determined independently of the amount of each component contained as the masterbatch in the polyolefin resin composition. Based on 100 parts by mass of the polyolefin resin, the amount of the nucleating agent (B) is in the range between 0.001 and 5 parts by mass and the amount of the fatty acid metal salt (C) is in the range between 0.001 and 5 parts by mass.

Examples of various compounding agents include phenol antioxidants, sulfur antioxidants, phosphorus antioxidants, ultraviolet absorbers, hindered amine compounds, other nucleating agents, flame retardants, flame retardant assistants, lubricants, fillers, fibrous fillers, metallic soaps, hydrotalcites, antistatic agents, pigments and dyes. The amount of the compounding agent to be added to the masterbatch according to the present invention can be up to 20 parts by mass as a total amount of each compounding agent, based on 100 parts by mass of a masterbatch component. When the amount of the compounding agent to be added to the masterbatch is too much, effects of the present invention (dispersibility into the resin, improvement of transparency) are impaired, which is not preferred. And, the amount of the compounding agent to be added based on the polyolefin resin composition according to the present invention is as follows.

Examples of the above-mentioned phenol antioxidant include 2,6-di-tert-butyl-p-cresol, 2,6-diphenyl-4-octadesiloxyphenol, distearyl(3,5-di-tert-butyl-4-hydroxybenzyl) phosphonate, 1,6-hexamethylenebis[(3,5-di-tert-butyl-4-hydroxyphenyl)propionic acid amide], 4,4'-thiobis(6-tert-butyl-m-cresol), 2,2'-methylenebis(4-methyl-6-tert-butylphenol), 2,2'-methylenebis(4-ethyl-6-tert-butylphenol), 4,4'-butylidenebis(6-tert-butyl-m-cresol), 2,2'-ethylidenebis(4,6-di-tert-butylphenol), 2,2'-ethylidenebis(4-sec-butyl-6-tert-butylphenol), 1,1,3-tris(2-methyl-4-hydroxy-5-tert-butylphenyl)butane, 1,3,5-tris(2,6-dimethyl-3-hydroxy-4-tert-butylbenzyl)isocyanurate, 1,3,5-tris(3,5-di-tert-butyl-4-hydroxybenzyl)isocyanurate, 1,3,5-tris(3,5-di-tert-butyl-4-hydroxybenzyl)-2,4,6-trimethylbenzene, 2-tert-butyl-4-methyl-6-(2-acryloyloxy-3-tert-butyl-5-methylbenzyl) phenol, stearyl(3,5-di-tert-butyl-4-hydroxyphenyl) propionate, thiodiethylene glycol bis[(3,5-di-tert-butyl-4-hydroxyphenyl)propionate], 1,6-hexamethylenebis[(3,5-di-tert-butyl-4-hydroxyphenyl)propionate], bis[3,3-bis(4-hydroxy-3-tert-butylphenyl)butyric acid]glycol ester, bis[2-tert-butyl-4-methyl-6-(2-hydroxy-3-tert-butyl-5-methylbenzyl)phenyl]terephthalate, 1,3,5-tris[(3,5-di-tert-butyl-4-hydroxyphenyl)propionyloxyethyl]isocyanurate, 3,9-bis[1,1-dimethyl-2-{(3-tert-butyl-4-hydroxy-5-methylphenyl)propionyloxy}ethyl]-2,4,8,10-tetraoxaspiro[5.5] undecane and triethylene glycol bis[(3-tert-butyl-4-hydroxy-5-methylphenyl)propionate]. Based on 100 parts by mass of the polyolefin resin, 0.001 to 10 parts by mass, more preferably 0.01 to 5 parts by mass of the phenol antioxidant is used.

Examples of the above-mentioned sulfur antioxidant include dialkyl thiodipropionates such as dilauryl thiodipropionate, dimyristyl thiodipropionate and distearyl thiodipropionate and β-alkyl mercaptopropionates of polyol such as pentaerythritol tetra(β-dodecyl mercaptopropionate). Based on 100 parts by mass of the polyolefin resin, 0.001 to 10 parts by mass, more preferably 0.01 to 5 parts by mass of the sulfur antioxidant is used.

Examples of the above-mentioned phosphorus antioxidant include trisnonylphenyl phosphite, tris[2-tert-butyl-4-(3-tert-butyl-4-hydroxy-5-methylphenylthio)-5-methylphenyl] phosphite, tridecyl phosphite, octyldiphenyl phosphite, di(decyl)monophenyl phosphite, di(tridecyl)pentaerythritol diphosphite, di(nonylphenyl)pentaerythritol diphosphite, bis (2,4-di-tert-butylphenyl)pentaerythritol diphosphite, bis(2,6-di-tert-butyl-4-methylphenyl)pentaerythritol diphosphite, bis(2,4,6-tri-tert-butylphenyl)pentaerythritol diphosphite, bis(2,4-dicumylphenyl)pentaerythritol diphosphite, tetra (tridecyl)isopropylidenediphenol diphosphite, tetra(tridecyl)-4,4'-n-butylidenebis(2-tert-butyl-5-methylphenol) diphosphite, hexa(tridecyl)-1,1,3-tris(2-methyl-4-hydroxy-5-tert-butylphenyl)butane triphosphite, tetrakis(2,4-di-tert-butylphenyl)biphenylene diphosphonite, 9,10-dihydro-9-oxa-10-phosphaphenanthrene-10-oxide, 2,2'-methylenebis (4,6-tert-butylphenyl)-2-ethylhexyl phosphite, 2,2'-methylenebis(4,6-tert-butylphenyl)-octadecyl phosphite, 2,2'-ethylidenebis(4,6-di-tert-butylphenyl)fluorophosphite, tris(2-[(2,4,8,10-tetrakis-tert-butyldibenzo[d,f][1,3,2]dioxaphosphepine-6-yl)oxy]ethyl)amine and phosphites of 2-ethyl-2-butylpropylene glycol and 2,4,6-tri-tert-butylphenol. Based on 100 parts by mass of the polyolefin resin, 0.001 to 10 parts by mass, more preferably 0.01 to 5 parts by mass of the phosphorus antioxidant is used.

Examples of the above-mentioned ultraviolet absorber include 2-hydroxybenzophenones such as 2,4-dihydroxybenzophenone, 2-hydroxy-4-methoxybenzophenone, 2-hydroxy-4-octoxybenzophenone or 5,5'-methylenebis(2-hydroxy-4-methoxybenzophenone); 2-(2'-hydroxyphenyl) benzotriazoles such as 2-(2'-hydroxy-5'-methylphenyl) benzotriazole, 2-(2'-hydroxy-3',5'-di-tert-butylphenyl)-5-chlorobenzotriazole, 2-(2'-hydroxy-3'-tert-butyl-5'-methylphenyl)-5-chlorobenzotriazole, 2-(2'-hydroxy-5'-tert-octylphenyl)benzotriazole, 2-(2'-hydroxy-3',5'-dicumylphenyl)benzotriazole or 2-(2'-hydroxy-3'-tert-butyl-5'-carboxyphenyl)benzotriazole; benzoates such as phenyl salicylate, resorcinol monobenzoate, 2,4-di-tert-butylphenyl-3,5-di-tert-butyl-4-hydroxybenzoate, 2,4-di-tert-amylphenyl-3,5-di-tert-butyl-4-hydroxybenzoate or hexadecyl-3,5-di-tert-butyl-4-hydroxybenzoate; substituted oxanilides such as 2-ethyl-2'-ethoxyoxanilide or 2-ethoxy-4'-dodecyloxanilide; cyanoacrylates such as ethyl-α-cyano-β,β-diphenyl acrylate or methyl-2-cyano-3-methyl-3-(p-methoxyphenyl) acrylate; triaryltriazines such as 2-(2-hydroxy-4-octoxyphenyl)-4,6-bis(2,4-di-tert-butylphenyl)-s-triazine, 2-(2-hydroxy-4-methoxyphenyl)-4,6-diphenyl-s-triazine or 2-(2-hydroxy-4-propoxy-5-methylphenyl)-4,6-bis(2,4-di-tert-butylphenyl)-s-triazine. Based on 100 parts by mass of the polyolefin resin, 0.001 to 10 parts by mass, more preferably 0.01 to 5 parts by mass of the ultraviolet absorber is used.

Examples of the above-mentioned hindered amine light stabilizer (hindered amine compound) include hindered amine compounds such as 2,2,6,6-tetramethyl-4-piperidyl stearate, 1,2,2,6,6-pentamethyl-4-piperidyl stearate, 2,2,6,6-tetramethyl-4-piperidyl benzoate, bis(2,2,6,6-tetramethyl-4-piperidyl)sebacate, bis(1,2,2,6,6-pentamethyl-4-piperidyl) sebacate, tetrakis(2,2,6,6-tetramethyl-4-piperidylbutane tetracarboxylate, tetrakis(1,2,2,6,6-pentamethyl-4-piperidylbutane tetracarboxylate, bis(2,2,6,6-tetramethyl-4-piperidyl)•di(tridecyl)-1,2,3,4-butane tetracarboxylate, bis(1,2,2,6,6-pentamethyl-4-piperidyl)•di(tridecyl)-1,2,3,4-butane tetracarboxylate, bis(1,2,2,6,6-pentamethyl-4-piperidyl)-2-butyl-2-(3,5-di-tert-butyl-4-hydroxybenzyl)malonate, 1-(2-hydroxyethyl)-2,2,6,6-tetramethyl-4-piperidinol/diethyl succinate polycondensate, 1,6-bis(2,2,6,6-tetramethyl-4-piperidylamino)hexane/dibromoethane polycondensate, 1,6-bis (2,2,6,6-tetramethyl-4-piperidylamino)hexane/2,4-dichloro-6-morpholino-s-triazine polycondensate, 1,6-bis(2,2,6,6-tetramethyl-4-piperidylamino)hexane/2,4-dichloro-6-tert-octylamino-s-triazine polycondensate, 1,5,8,12-tetrakis[2,4-bis(N-butyl-N-(2,2,6,6-tetramethyl-4-piperidyl)amino)-s-triazine-6-yl]-1,5,8,12-tetraazadodecane, 1,5,8,12-tetrakis [2,4-bis(N-butyl-N-(1,2,2,6,6-pentamethyl-4-piperidyl) amino)-s-triazine-6-yl]-1,5,8,12-tetraazadodecane, 1,6,11-tris[2,4-bis(N-butyl-N-(2,2,6,6-tetramethyl-4-piperidyl) amino)-s-triazine-6-ylaminoundecane and 1,6,11-tris[2,4-bis(N-butyl-N-(1,2,2,6,6-pentamethyl-4-piperidyl)amino)-s-triazine-6-ylaminoundecane. Based on 100 parts by mass of the polyolefin resin, 0.001 to 10 parts by mass, more preferably 0.01 to 5 parts by mass of the hindered amine compound is used.

Examples of the other nucleating agents described above include metal salts of benzoic acid such as aluminum-p-tert-butyl benzoate or lithium-p-tert-butyl benzoate; benzylidene sorbitols such as dibenzylidene sorbitol, bis(4-methylbenzylidene)sorbitol, bis(4-ethylbenzylidene)sorbitol or bis (dimethylbenzylidene)sorbitol; metal alcoholates such as glycerin zinc; amino acid metal salts such as zinc glutamate; and aliphatic dibasic acid having a bicyclo structure such as bicycloheptane dicarboxylic acid or salts thereof. The ratio of concomitant use of these other nucleating agents is, based on 100 parts by mass of aromatic phosphate metal salt (B) represented by the above-mentioned general formula (1), not more than 100 parts by mass, preferably 3 to 50 parts by mass.

Examples of the above-mentioned flame retardant include halogen flame retardants; phosphorus flame retardants such as red phosphorus, melamine phosphate, guanidine phosphate, phosphate compound or phosphazene compounds; nitrogen flame retardants such as melamine cyanurate; and metal hydroxides such as magnesium hydroxide or aluminum hydroxide. Also, examples of the flame retardant assistant include inorganic compounds such as antimony trioxide or zinc borate; and dripping inhibitors such as polytetrafluoroethylene.

As for the above-mentioned hydrotalcites, either natural products or synthetic compounds can be used with or without a surface treatment, or regardless of the presence of crystallization water. Examples include the basic carbonate represented by the following general formula (3).

$$M_xMg_yAl_zCO_3(OH)_{xp+2y+3z-2} \cdot nH_2O \qquad (3)$$

(wherein M represents an alkali metal or zinc; X represents number of 0 to 6; y represents number of 0 to 6; z represents number of 0.1 to 4; p represents the valence of M; and n represents the number of crystallization water, which is 0 to 100).

Examples of the above-mentioned lubricant include fatty acid amides such as lauryl amide, myristyl amide, stearyl amide or behenyl amide; metallic soap such as ethylene bis stearyl amide, polyethylene wax, calcium stearate or magnesium stearate; phosphate metal salts such as magnesium distearyl phosphate or magnesium stearyl phosphate.

As the above-mentioned filler, inorganic substances such as talc, silica, calcium carbonate, glass fiber, potassium titanate or potassium borate are used with a particle diameter for spherical substances and a diameter and length of fiber as well as an aspect ratio for fibrous substances being appropriately selected. Also, it is preferred to use fillers which were, as necessary, subjected to surface treatment.

Examples of the above-mentioned antistatic agent include cationic antistatic agents such as aliphatic quaternary ammonium ion salts or quaternary polyamine salts; anionic antistatic agents such as higher alcohol phosphate salt, higher alcohol EO adduct, polyethylene glycol fatty acid ester, anionic alkyl sulfonate, higher alcohol sulfate, higher alcohol ethylene oxide adduct sulfate or higher alcohol ethylene oxide adduct phosphate salt; nonionic antistatic agents such as polyalcohol fatty acid ester, polyglycol phosphate or polyoxyethylene alkyl allyl ether; or amphoteric antistatic agents such as amphoteric alkyl betaine such as alkyl dimethyl amino acetic acid betaine or imidazoline type amphoteric surfactant. These antistatic agents may be individually used; or two or more types of the antistatic agents may be used in combination.

Also, in cases where the polyolefin resin composition according to the present invention is used in films for agriculture, an ultraviolet absorber may be blended in order to control growth of crops or an infrared absorber may be blended in order to improve warmth retaining property. In this case, since fog may develop in a greenhouse and condensation occurs on the surface of the films, resulting in sufficient light not reaching crops, an anti-clouding agent or anti-fog agent may be blended.

The polyolefin resin composition according to the present invention to which the masterbatch according to the present invention is added can be used in various applications including resin parts for automobiles such as bumpers, dashboards or instrument panels; resin parts for consumer electrical appliances such as refrigerators, washing machines or cleaners; household products such as tableware, buckets or bathing goods; resin parts for connection such as connectors; miscellaneous goods such as toys; storage containers such as tanks or bottles; molded articles for medical use such as packs for medical use, syringes, catheters, tubes for medical use; construction materials such as wall materials, flooring materials, window frames and wallpapers; electric wire coating materials; materials for agriculture such as greenhouses and tunnels; molded articles including cling wraps, films for food wrapping materials such as trays and sheets; and fibers.

EXAMPLES

The present invention will now be described in more detail by way of examples thereof. However, the present invention is not restricted by the following examples.

<Production of Masterbatch>

In accordance with the formulations indicated in the tables below, masterbatches were produced in the following manner. Here, all of the values indicating the formulations in the tables are in parts by mass.

(Production of Mb-1)

Added to 100 parts by mass of fully hydrogenated petroleum resin (Component (A)) (produced by Arakawa Chemical Industries, Ltd., trade name ARKON P-140: softening point at 140° C.) was 100 parts by mass of the above-described Compound No. 8 as aromatic phosphate ester metal salt compound (Component (B)), and the resultant was stirred for 20 minutes using Henschel mixer. The thus obtained powder was pelletized at 140° C. by an extruder to obtain a masterbatch (MB-1).

(Production of Mb-2 to Mb-11)

In accordance with the formulations indicated in Tables 1 and 2 below, petroleum resin, aromatic phosphate ester metal salt (Component (B)) and fatty acid metal salts (Component (C)) were blended to obtain masterbatches MB-2 to MB-11 in the same manner as in the above-described production of MB-1.

(Production of Mb-12 to Mb-16)

As indicated in Table 3 below, masterbatches MB-12 to MB-16 were produced in the same manner as in the above-described production of MB-1 except that various types of binder resins were employed in place of the petroleum resin. (It should be noted that, for MB-13, the temperature of the extruder was set at 165° C.)

TABLE 1

|  |  |  | MB-1 | MB-2 | MB-3 | MB-4 | MB-5 |
|---|---|---|---|---|---|---|---|
|  |  | Name of masterbatch |  |  |  |  |  |
| Composition | Petroleum resin*[1] | Type | a | b | c | a | a |
|  |  | (parts by mass) | 100 | 100 | 100 | 100 | 100 |
|  | Component (B) | Compound No. 2 | — | — | — | — | 10 |

TABLE 1-continued

| Name of masterbatch | | MB-1 | MB-2 | MB-3 | MB-4 | MB-5 |
|---|---|---|---|---|---|---|
| aromatic phosphate ester metal salt | Compound No. 8 | 100 | 100 | 100 | — | — |
| | Compound No. 15 | — | — | — | 40 | — |
| Component (C) fatty acid metal salts | lithium myristate | — | — | — | 30 | — |
| | lithium hydroxystearate | — | — | — | — | 1 |

TABLE 2

| | Name of masterbatch | | MB-6 | MB-7 | MB-8 | MB-9 | MB-10 | MB-11 |
|---|---|---|---|---|---|---|---|---|
| Composition | Petroleum resin*1 | Type | d | e | f | g | h | a |
| | | (parts by mass) | 100 | 100 | 100 | 100 | 100 | 100 |
| | Component (B) | Compound No. 2 | — | — | — | — | — | — |
| | aromatic phosphate ester metal salt | Compound No. 8 | 100 | 100 | 100 | 100 | 100 | — |
| | | Compound No. 15 | — | — | — | — | — | 200 |
| | Component (C) fatty acid metal salts | lithium myristate | — | — | — | — | — | 25 |
| | | lithium hydroxystearate | — | — | — | — | — | — |

TABLE 3

| | Name of masterbatch | | MB-12 | MB-13 | MB-14 | MB-15 | MB-16 |
|---|---|---|---|---|---|---|---|
| Composition | Binder resin*2 | Type | i | j | k | l | m |
| | | (parts by mass) | 100 | 100 | 100 | 100 | 100 |
| | Component (B) | Compound No. 2 | — | — | — | — | — |
| | aromatic phosphate ester metal salt | Compound No. 8 | 100 | 100 | 100 | 100 | 100 |
| | | Compound No. 15 | — | — | — | — | — |
| | Component (C) fatty acid metal salts | lithium myristate | — | — | — | — | — |
| | | lithium hydroxystearate | — | — | — | — | — |

*1) Petroleum Resins
Petroleum resin a; fully hydrogenated petroleum resin: produced by Arakawa Chemical Industries, Ltd., trade name ARKON P-140 (softening point at 140° C.)
Petroleum resin b; fully hydrogenated petroleum resin: produced by Arakawa Chemical Industries, Ltd., trade name ARKON P-115 (softening point at 115° C.)
Petroleum resin c; fully hydrogenated petroleum resin: produced by Maruzen Petrochemical Co., Ltd., trade name MARUKAREZ H505 (softening point at 103° C.)
Petroleum resin d; fully hydrogenated petroleum resin: produced by Arakawa Chemical Industries, Ltd., trade name ARKON P-90 (softening point at 90° C.)
Petroleum resin e; fully hydrogenated petroleum resin: produced by Maruzen Petrochemical Co., Ltd., trade name MARUKAREZ H790H (softening point at 95° C.)
Petroleum resin f; partially hydrogenated petroleum resin: produced by Arakawa Chemical Industries, Ltd., trade name ARKON M-135 (softening point at 135° C.)
Petroleum resin g; aliphatic petroleum resin: produced by Maruzen Petrochemical Co., Ltd., trade name MARUKAREZ T100A (softening point at 104° C.)
Petroleum resin h; dicyclopentadiene petroleum resin: produced by Maruzen Petrochemical Co., Ltd., trade name MARUKAREZ M510 (softening point at 110° C.)

*2) Binder Resins
Binder resin i; LLDPE wax (produced by Mitsui Chemicals, Inc., trade name NL-100 (melting point at 110° C.))
Binder resin j; maleic acid-modified polypropylene (produced by Mitsui Chemicals, Inc., trade name Admer QF-500 (melting point at 162° C.))
Binder resin k; HDPE (high-density polyethylene) (reagent produced by ALDRICH: melting point at 125-130° C.)
Binder resin l; propylene/butene-1 resin (produced by Ube Industries, Ltd., trade name UT2715)
Binder resin m; α-olefin compound having not less than 30 carbon atoms (produced by Mitsubishi Chemical Corporation, trade name Daialen 30 (melting point not less than 75° C.))

<Blending to Polyolefin Resin>

Example 1-1

To 100 parts by mass of homopolypropylene resin (Melt Index 8-9), 0.1 parts by mass of phenol antioxidant; tetrakis[methylene-3-(3',5'-di-tert-butyl-4'-hydroxyphenyl)propionate]methane, 0.1 parts by mass of phosphorus antioxidant; tris(2,4-di-tert-butylphenyl) phosphite, 0.05 parts by mass of calcium stearate and the masterbatch (MB-1) which was previously produced according to the formulation indicated in Table 1 above were added in such a manner that the amount of aromatic phosphate ester metal salt compound component (Component (B)) was 0.1 parts by mass with respect to the homopropylene resin. The resultant was mixed for 5 minutes using Henschel mixer at 1,100 rpm and the thus obtained mixture was extruded at 250° C. and 160 rpm to produce a pellet. This pellet was then used for injection molding at 230° C. to obtain a test piece having a thickness of 1 mm, which was evaluated for the haze value (JIS K7105) and bending modulus (ASTM D-790). The results are shown in Table 4 below.

Comparative Examples 1-1 to 1-5

The masterbatches were blended to polypropylene resin to produce pellets in the same manner as in the above Example 1-1 except that the masterbatches were changed as indicated in Table 4 below. Further, the thus obtained pellets were evaluated for the haze value and bending modulus in the same manner as in Example 1-1. The results are collectively shown in Table 4 below.

Examples 2-1 to 2-3 and Comparative Examples 2-1 to 2-5

To 100 parts by mass of homopolypropylene resin (Melt Index 8-9), 0.1 parts by mass of phenol antioxidant; tetrakis [methylene-3-(3',5'-di-tert-butyl-4'-hydroxyphenyl)propionate]methane, 0.1 parts by mass of phosphorus antioxidant; tris(2,4-di-tert-butylphenyl) phosphite, 0.05 parts by mass of calcium stearate and the masterbatches indicated in Table 5 below were added in such a manner that the amount of aromatic phosphate ester metal salt compound component (Component (B)) was 0.2 parts by mass with respect to the homopropylene resin. The resultants were mixed for 5 minutes using Henschel mixer at 1,100 rpm and the thus obtained mixtures were extruded at 250° C. and 160 rpm to produce pellets. These pellets were then used for injection molding at 230° C. to obtain test pieces having a thickness of 1 mm, which were evaluated for the haze value, bending modulus and Y.I. (Yellow Index: differential colorimeter produced by Suga Test Instruments Co., Ltd.). The results are collectively shown in Table 5 below.

Examples 3-1 to 3-2 and Comparative Example 3-1

To 100 parts by mass of homopolypropylene resin (Melt Index 7-8), 0.1 parts by mass of phenol antioxidant; tetrakis [methylene-3-(3',5'-di-tert-butyl-4'-hydroxyphenyl)propionate]methane, 0.1 parts by mass of phosphorus antioxidant; tris(2,4-di-tert-butylphenyl) phosphite, 0.05 parts by mass of calcium stearate and the masterbatches indicated in Table 6 below were added in such a manner that the amount of aromatic phosphate ester metal salt compound component (Component (B)) was 0.2 parts by mass with respect to the homopropylene resin. The resultants were mixed for 5 minutes using Henschel mixer at 1,100 rpm and the thus obtained mixtures were extruded at 250° C. and 160 rpm to produce pellets. These pellets were then used for injection molding at 230° C. to obtain test pieces having a thickness of 1 mm, which were evaluated for the haze value and bending modulus. The results are collectively shown in Table 6 below.

Comparative Example 3-2

To 100 parts by mass of homopolypropylene resin (Melt Index 7-8), 0.1 parts by mass of phenol antioxidant; tetrakis [methylene-3-(3',5'-di-tert-butyl-4'-hydroxyphenyl)propionate]methane, 0.1 parts by mass of phosphorus antioxidant; tris(2,4-di-tert-butylphenyl) phosphite, 0.05 parts by mass of calcium stearate, 0.15 parts by mass of aromatic phosphate ester metal salt compound (Component (B): the above-described Compound No. 15) and 0.1 parts by mass of fatty acid metal salts (Component (C): lithium myristate) were added. The resultant was mixed for 5 minutes using Henschel mixer at 1,100 rpm and the thus obtained mixture was extruded at 250° C. and 160 rpm to produce a pellet. This pellet was then used for injection molding at 230° C. to obtain a test piece having a thickness of 1 mm, which was evaluated for the haze value and bending modulus. The results are collectively shown in Table 6 below.

Comparative Example 3-3

To 100 parts by mass of homopolypropylene resin (Melt Index 7-8), 0.1 parts by mass of phenol antioxidant; tetrakis [methylene-3-(3',5'-di-tert-butyl-4'-hydroxyphenyl)propionate]methane, 0.1 parts by mass of phosphorus antioxidant; tris(2,4-di-tert-butylphenyl) phosphite, 0.05 parts by mass of calcium stearate and 0.2 parts by mass of fully hydrogenated petroleum resin (Component (A): produced by Arakawa Chemical Industries, Ltd., trade name ARKON P-140) were added. The resultant was mixed for 5 minutes using Henschel mixer at 1,100 rpm and the thus obtained mixture was extruded at 250° C. and 160 rpm to produce a pellet. This pellet was then used for injection molding at 230° C. to obtain a test piece having a thickness of 1 mm, which was evaluated for the haze value and bending modulus. The results are collectively shown in Table 6 below.

TABLE 4

|  | Example | Comparative Example | | | | |
| --- | --- | --- | --- | --- | --- | --- |
|  | 1-1 | 1-1 | 1-2 | 1-3 | 1-4 | 1-5 |
| Masterbatch used | MB-1 | MB-12 | MB-13 | MB-14 | MB-15 | MB-16 |
| Binder resin*[3] | a | i | j | k | l | m |
| Haze value (%) | 38.5 | 48.7 | 46.0 | 67.3 | 53.6 | 49.6 |
| Bending modulus (MPa) | 1850 | 1740 | 1810 | 1680 | 1750 | 1800 |

*[3]Binder resins
a; fully hydrogenated petroleum resin: produced by Arakawa Chemical Industries, Ltd., trade name ARKON P-140 (softening point at 140° C.)
i; LLDPE wax (produced by Mitsui Chemicals, Inc., trade name NL-100 (melting point at 110° C.))
j; maleic acid-modified polypropylene (produced by Mitsui Chemicals, Inc., trade name Admer QF-500 (melting point at 162° C.))
k; HDPE (high-density polyethylene) (reagent produced by ALDRICH: melting point at 125-130° C.)
l; propylene/butene-1 resin (produced by Ube Industries, Ltd., trade name UT2715)
m; α-olefin compound having not less than 30 carbon atoms (produced by Mitsubishi Chemical Corporation, trade name Daialen 30 (melting point not less than 75° C.))

TABLE 5

| | Example | | | Comparative Example | | | | |
|---|---|---|---|---|---|---|---|---|
| | 2-1 | 2-2 | 2-3 | 2-1 | 2-2 | 2-3 | 2-4 | 2-5 |
| Masterbatch used | MB-1 | MB-2 | MB-3 | MB-6 | MB-7 | MB-8 | MB-9 | MB-10 |
| Binder resin[*4] | a | b | c | d | e | f | g | h |
| Haze value (%) | 43.1 | 44.1 | 43.9 | 46.6 | 45.3 | 46.8 | 46.0 | 46.2 |
| Bending modulus (MPa) | 1930 | 1900 | 1910 | 1870 | 1900 | 1910 | 1910 | 1890 |
| Y.I | 6.4 | 6.4 | 6.4 | 6.8 | 6.5 | 6.6 | 6.7 | 7.1 |

[*4]Binder resins
a; fully hydrogenated petroleum resin: produced by Arakawa Chemical Industries, Ltd., trade name ARKON P-140 (softening point at 140° C.)
b; fully hydrogenated petroleum resin: produced by Arakawa Chemical Industries, Ltd., trade name ARKON P-115 (softening point at 115° C.)
c; fully hydrogenated petroleum resin: produced by Maruzen Petrochemical Co., Ltd., trade name MARUKAREZ H505 (softening point at 103° C.)
d; fully hydrogenated petroleum resin: produced by Arakawa Chemical Industries, Ltd., trade name ARKON P-90 (softening point at 90° C.)
e; fully hydrogenated petroleum resin: produced by Maruzen Petrochemical Co., Ltd., trade name MARUKAREZ H790H (softening point at 95° C.)
f; partially hydrogenated petroleum resin: produced by Arakawa Chemical Industries, Ltd., trade name ARKON M-135 (softening point at 135° C.)
g; aliphatic petroleum resin: produced by Maruzen Petrochemical Co., Ltd., trade name MARUKAREZ T100A (softening point at 104° C.)
h; dicyclopentadiene petroleum resin: produced by Maruzen Petrochemical Co., Ltd., trade name MARUKAREZ M510 (softening point at 110° C.)

TABLE 6

| | Example | | Comparative Example | | |
|---|---|---|---|---|---|
| | 3-1 | 3-2 | 3-1 | 3-2 | 3-3 |
| Masterbatch used | MB-4 | MB-5 | MB-11 | —[*5] | —[*6] |
| Binder resin[*7] | a | a | a | — | — |
| Haze value (%) | 22.8 | 22.4 | 29.0 | 34.9 | 37.5 |
| Bending modulus (MPa) | 1850 | 1880 | 1720 | 1820 | 1460 |

[*5]No petroleum resin Component (A)
[*6]No nucleating agent Component (B)
[*7]Binder resin
resin a; fully hydrogenated petroleum resin: produced by Arakawa Chemical Industries, Ltd., trade name ARKON P-140 (softening point at 140° C.)

As clearly seen from the results shown in the above Tables 4 to 6, the haze values and bending modulus were prominently inferior when a masterbatch using a binder resin other than the petroleum resins of the present invention was added to polyolefin resin. Further, also regarding the type of the petroleum resin, it can be seen from the results in Table 5 that favorable resistance to heat discoloration (Y.I.) as well as relatively favorable haze values were obtained only in cases where a specific fully hydrogenated petroleum resin of the present invention was used. Moreover, it can be seen from the results in Table 6 that, also regarding the ratio of a specific fully hydrogenated petroleum resin and a specific nucleating agent, the haze values were increased, as in Comparative Example 3-1, in cases where the ratio was not within the range of the present invention, and that favorable haze values were obtained only when the ratio was within the range of the present invention. Still further, it can be seen from the comparisons between Comparative Example 3-2 or 3-3 and Examples that the resins using the masterbatch of the present invention demonstrated a prominent effect to improve the haze value and bending modulus.

As described in the above, by using a masterbatch in which a specific fully hydrogenated petroleum resin and a specific aromatic phosphate ester metal salt according to the present invention were employed, a polyolefin resin composition having an excellent compatibility with polyolefin resin, favorable haze value, excellent mechanical physical properties such as bending modulus and resistance to heat discoloration, can be obtained.

The invention claimed is:

1. A nucleating agent masterbatch for polyolefin resin, comprising, based on 100 parts by mass of a fully hydrogenated petroleum resin (A) having a softening point of not lower than 100° C., 10 to 100 parts by mass of an aromatic phosphate metal salt (B) represented by the following general formula (1) added thereto:

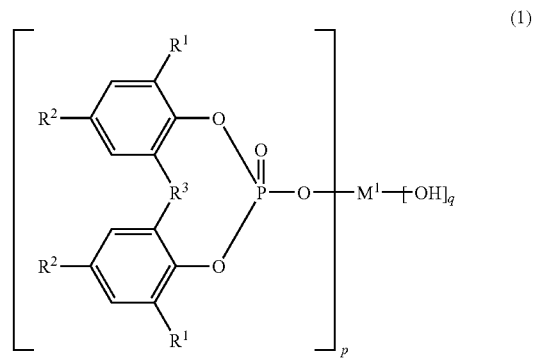

(1)

wherein $R^1$ represents a $C_4$-$C_8$ alkyl group; $R^2$ represents a hydrogen atom or a $C_1$-$C_8$ alkyl group; $R^3$ represents a $C_1$-$C_4$ alkylidene group; $M^1$ represents an alkaline metal atom, an alkaline earth metal atom or an aluminum atom; in cases where $M^1$ is an alkaline metal atom, p is 1 and q is 0, in cases where $M^1$ is an alkaline earth metal atom, p is 2 and q is 0, and in cases where $M^1$ is an aluminum atom, p is 1 or 2 and q is 3-p.

2. The nucleating agent masterbatch for polyolefin resin according to claim 1, said masterbatch being used for a polypropylene or polyethylene resin as the polyolefin resin.

3. The nucleating agent masterbatch for polyolefin resin according to claim 1, wherein 0.1 to 100 parts by mass of a metal salt of fatty acid or hydroxy fatty acid (C) represented by the following general formula (2) is further blended:

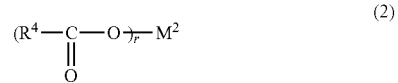

(2)

wherein R⁴ represents a group introduced from a $C_8$-$C_{30}$ aliphatic organic acid; $M^2$ represents an alkaline metal atom, an alkaline earth metal atom, an aluminum atom or a zinc atom; and r represents an integer of 1 to 3.

4. The nucleating agent masterbatch for polyolefin resin according to claim 3, said masterbatch being used for a polypropylene or polyethylene resin as the polyolefin resin.

5. A nucleating agent masterbatch for polyolefin resin, consisting essentially of, based on 100 parts by mass of a fully hydrogenated petroleum resin (A) having a softening point of not lower than 100° C, 10 to 100 parts by mass of an aromatic phosphate metal salt (B) represented by the following general formula (1) added thereto:

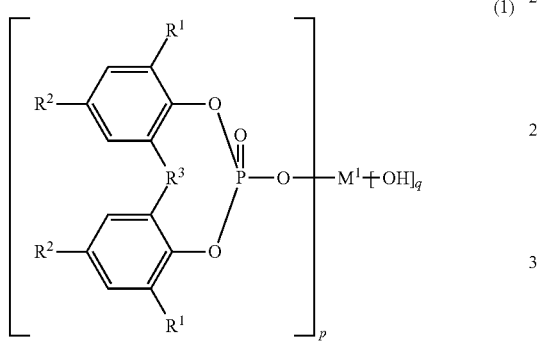

wherein $R^1$ represents a $C_4$ alkyl group; $R^2$ represents a hydrogen atom or a $C_4$ alkyl group; $R^3$ represents a $C_1$ alkylidene group; $M^1$ represents a lithium ion, sodium ion or an aluminum atom; in cases where $M^1$ is a lithium ion or sodium ion, p is 1 and q is 0, in cases where $M^1$ is an alkaline earth metal atom, p is 2 and q is 0, and in cases where $M^1$ is an aluminum atom, p is 1 or 2 and q is 3-p.

6. The nucleating agent masterbatch for polyolefin resin according to claim 5, wherein 0.1 to 100 parts by mass of a metal salt of fatty acid or hydroxy fatty acid (C) represented by the following general formula (2) is further blended:

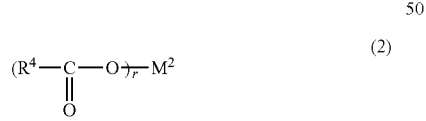

wherein R⁴ represents a group introduced from a $C_8$-$C_{30}$ aliphatic organic acid; $M^2$ represents an alkaline metal atom, an alkaline earth metal atom, an aluminum atom or a zinc atom; and r represents an integer of 1 to 3.

7. A nucleating agent masterbatch for polyolefin resin, comprising, based on 100 parts by mass of a fully hydrogenated petroleum resin (A) having a softening point of not lower than 100° C, 10 to 100 parts by mass of an aromatic phosphate metal salt (B) represented by the following general formula (1) added thereto:

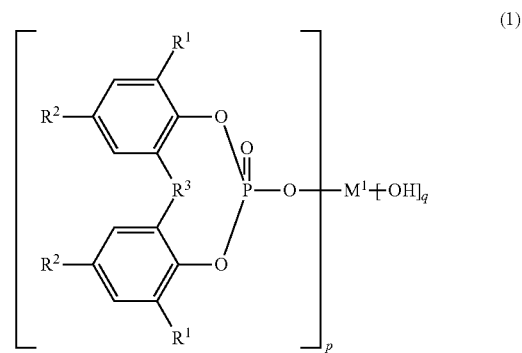

wherein $R^1$ represents a $C_4$ alkyl group; $R^2$ represents a hydrogen atom or a $C_4$ alkyl group; $R^3$ represents a $C_1$ alkylidene group; $M^1$ represents a lithium atom, sodium atom or aluminum atom; in cases where $M^1$ is lithium atom or sodium atom, p is 1 and q is 0, in cases where $M^1$ is an alkaline earth metal atom, p is 2 and q is 0, and in cases where $M^1$ is an aluminum atom, p is 1 or 2 and q is 3-p.

8. A nucleating agent masterbatch for polyolefin resin, consisting essentially of, based on 100 parts by mass of a fully hydrogenated petroleum resin (A) having a softening point of not lower than 100° C, 10 to 100 parts by mass of an aromatic phosphate metal salt (B) represented by the following general formula (1) added thereto:

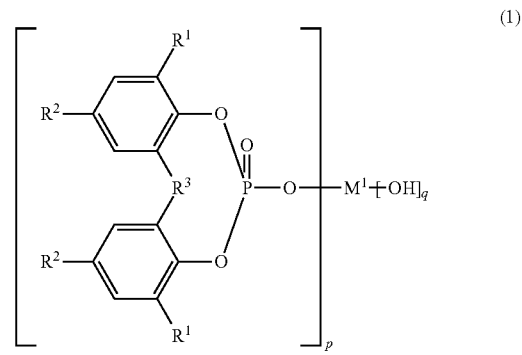

wherein $R^1$ represents a $C_4$-$C_8$ alkyl group; $R^2$ represents a hydrogen atom or a $C_1$-$C_8$ alkyl group; $R^3$ represents a $C_1$-$C_4$ alkylidene group; $M^1$ represents an alkaline metal atom, an alkaline earth metal atom or an aluminum atom; in cases where $M^1$ is an alkaline metal atom, p is 1 and q is 0, in cases where $M^1$ is an alkaline earth metal atom, p is 2 and q is 0, and in cases where $M^1$ is an aluminum atom, p is 1 or 2 and q is 3-p.

9. A polyolefin resin composition, comprising said nucleating agent masterbatch for polyolefin resin according to claim 1 added to the polyolefin resin.

10. A polyolefin resin composition, comprising said nucleating agent masterbatch for polyolefin resin according to claim 3 added to the polyolefin resin.

11. A polyolefin resin composition, comprising said nucleating agent masterbatch for polyolefin resin according to claim 2 added to the polyolefin resin.

12. A polyolefin resin composition, comprising said nucleating agent masterbatch for polyolefin resin according to claim 4 added to the polyolefin resin.

* * * * *